July 2, 1963
B. F. HART
3,095,774
METHOD AND APPARATUS FOR SEVERING A MOVING HELICAL STRIP
Filed Dec. 8, 1959
2 Sheets-Sheet 1
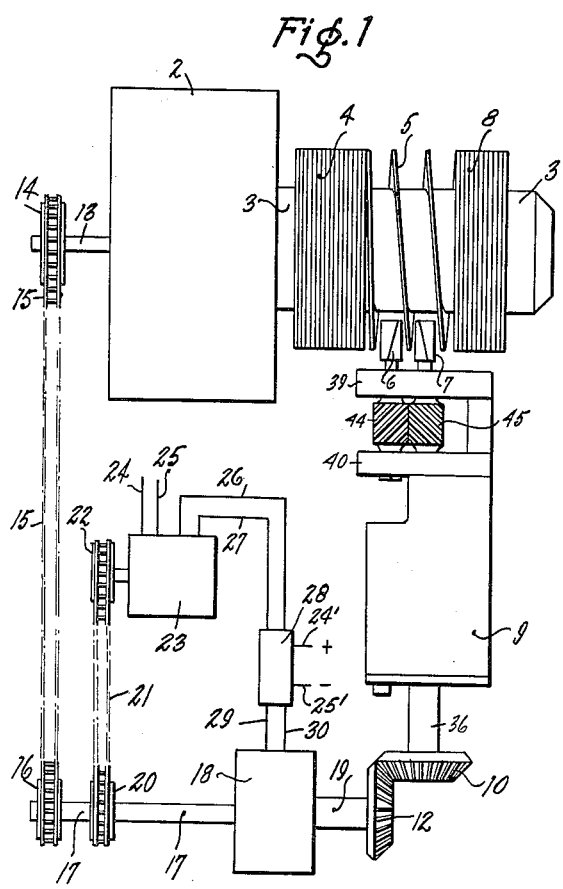
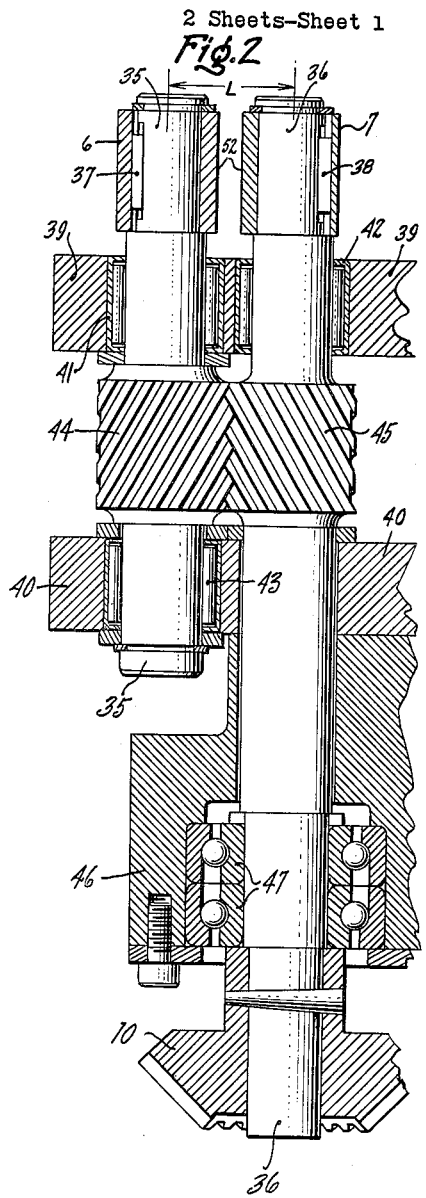
Inventor
Benjamin F. Hart
by Paul A. Frank
His Attorney July 2, 1963  B. F. HART  3,095,774
METHOD AND APPARATUS FOR SEVERING A MOVING HELICAL STRIP
Filed Dec. 8, 1959  2 Sheets-Sheet 2
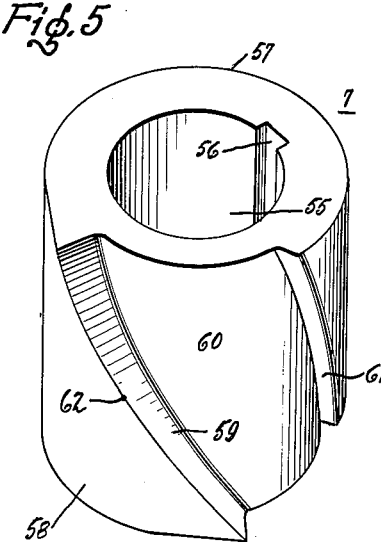
Fig. 5
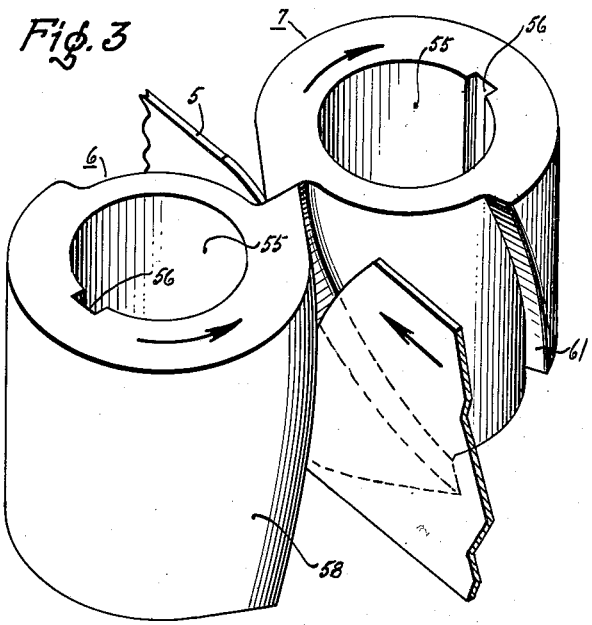
Fig. 3
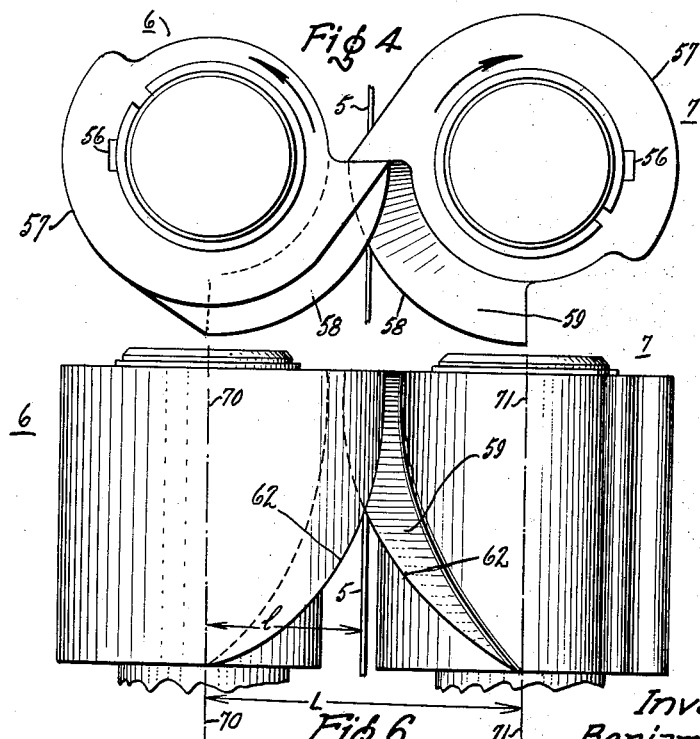
Fig. 4
Fig. 6
Inventor
Benjamin F. Hart
by Paul A. Frank
His Attorney United States Patent Office 3,095,774
Patented July 2, 1963

3,095,774
METHOD AND APPARATUS FOR SEVERING A MOVING HELICAL STRIP
Benjamin F. Hart, Ballston Lake, N.Y., assignor to General Electric Company, a corporation of New York
Filed Dec. 8, 1959, Ser. No. 858,200
12 Claims. (Cl. 83—37)

This invention relates to a method and apparatus for severing a moving strip and, more particularly, to a method and apparatus for severing a continuously rotating helically wound strip.

Helically wound strips have been widely used in the fabrication of heat exchange surfaces and, more recently, have been suggested in the fabrication of alternating current motor stators. Heretofore, motor stators have been fabricated from punched discs which are individually stacked and aligned. Extensive consideration has been given to forming such laminated constructions by helically winding the structure from notched strip material. Helically winding stators not only reduces the cost of material by reducing waste, but also due to the continuous nature of the fabrication process this type of construction achieves considerable savings by reducing labor costs.

Consonant with the cost saving philosophy behind the use of a helical winding process for fabricating such stators, there is a further need for automatic devices to fully realize the economies made possible by a continuous winding process. During the fabrication process, as the strip is given its arcuate shape, it is supported on a rotating arbor. The present invention envisions severing the helically wound strip in predetermined lengths or weights while the arbor upon which the helically wound strip is continuously rotated.

The chief object of the present invention is to provide an improved method and apparatus for severing a continuously moving strip.

Another object is to provide an improved method and apparatus for severing a continuously rotating helically wound strip.

A still further object is to provide an improved method and apparatus for severing a continuously rotating helically wound strip upon a predetermined amount of strip passing the cutting means.

A still further object is to provide an improved cutting device.

These and other objects of my invention will become more apparent from the following description.

One of the features of the present invention is a cutting device comprising two rotors having helical cutting edges adapted to move relative to one another in such a manner as to sever a strip of material while the material continuously passes through the cutting device.

In accordance with one form of the present invention, a moving helically wound strip having loosely separated turns is severed by urging a cutting edge to shear across one edge of an advancing strip toward the other edge of the advancing strip. The cutting edge is rotatable about an axis generally normal to the axis of rotation of the turn being severed and the turn has its side surface arranged generally parallel to the rotatable axis of the cutting edge as it moves past the edge. The shearing action continues while the cutting edge advances in the direction of movement of the moving strip.

The invention will be more clearly understood from the detailed description of a preferred embodiment described in the accompanying drawings, in which FIGURE 1 is a plan view of an apparatus employing the present invention;

FIGURE 2 is a sectional view of the means for rotating the cutter members of the apparatus shown in FIGURE 1;

FIGURE 3 is a perspective view showing the action of the shear blades relative to a moving strip;

FIGURE 4 is a plan view of FIGURE 3;

FIGURE 5 is a perspective view of a cutter, and

FIGURE 6 is a view in elevation of the cutters shown in FIGURE 4 taken in a plane normal to the direction of the moving strip.

Referring to FIGURE 1, there is shown a plan view of an apparatus employing the present invention. A prime mover 2, preferably a motor drive having a gear reducer, is operatively connected to a suitable arbor 3 having mounted thereon a helically wound strip. The strip may be placed on the arbor either by manual transfer or by direct winding of strip material into a helical shape thereon. A plurality of turns of strip material 4 is mounted on arbor 3, and in the area of cutters 6 and 7 a single helical turn 5 of the strip material is extended between the cutters. In response to means to be more fully described hereinafter, cutters 6 and 7 are actuated to sever strip 5 so that predetermined amounts of material 8 are collected on the end of arbor 3. The character of cutters 6 and 7 and actuating means 9 will be more fully described hereinafter.

Actuating means 9 is driven by a suitable miter gear 10 which engages miter gear 12. Miter gear 12 is mounted on shaft 19 which is connected to shaft 17 by means of a magnetic clutch 18. Rotational motion is imparted to shaft 17 through sprockets 14 and 16 which are connected by a suitable belt 15. Sprocket 14 is connected by means of shaft 13 to drive means 2. Sprocket 16 is mounted on shaft 19.

The cutting operation is intermittent in nature, cutters 6 and 7 being driven by energizing clutch 18. To energize the clutch, a sprocket 20, mounted on shaft 17, is connected to sprocket 22 by means of belt 21. Sprocket 22 is operatively connected to counter mechanism 23. This counter mechanism may be suitably calibrated in accordance with the relationship between the various sprockets to indicate either the length and/or weight of strip material which passes between cutters 6 and 7. By this means the counter senses when a predetermined amount of material 8 has been collected on arbor 3 and actuates cutters 6 and 7.

A suitable switch in counter 23 is actuated whereby, at the time a predetermined amount of material has passed cutters 6 and 7, current will pass through lines 24 and 25, through counter 23, and then through lines 26 and 27 to relay 28. The energy supplied relay 28 closes the contacts of the relay for a predetermined time, permitting current to pass through lines 24' and 25' to lines 29 and 30 to clutch 18. The relay is so calibrated that current will pass to the clutch for a time sufficient to permit rotational energy to pass to actuating means 9 to rotate cutters 6 and 7 one full rotation.

In FIGURE 2, there is shown a sectional view of actuating means 9. Cutters 6 and 7 are connected by suitable keys 37 and 38 to parallel shafts 35 and 36. The shaft axes are separated by a distance L. Shafts 35 and 36 are mounted in a suitable support 39 by means of suitable bearings 41 and 42. A driving relationship is provided between these shafts by means of gears 44 and 45 so that rotation of shaft 36 will cause rotation of shaft 35. Shaft 35 rotates the same distance and at the same speed as shaft 36, however, the direction of rotation is opposite. Adjacent gears 44 and 45 is a second support 40. Shaft 35 is journalled in the support 40 by means of bearing 43. Shaft 36 extends through this support to the support member 46, which is provided with two ball bearings 47 adjacent to which is mounted miter gear 10 previously described in FIGURE 1.

Referring to FIGURE 3, there is disclosed a perspective view of cutters 6 and 7 showing these members cutting a strip 5. These cutters are substantially identical with the exception that the helical cutting edges have equal but opposite slopes. FIGURE 5 illustrates a perspective view of a single cutter. Each cutter is a substantially cylindrical member having a cylindrical opening 55 provided with a suitable keyway 56 for keying on a shaft. The outer periphery of the cylindrical member comprises an arcuate portion 57. As can be seen in FIGURE 2, this portion of the cutter may be of a width to permit the strip 5 to pass between cutters 6 and 7. The arcuate portion 57 extends around to a land portion 58 which also has a general arcuate surface, but which, however, is at a greater distance from the axis of the cutter. Land surface 58 terminates at cutting edge 62, which is defined substantially by the intersection of the land surface and helical surface 59. In order to provide clearance for cutting edge 62, the cutter has a recessed portion 60. The opposite extremity of recess 60 is bordered by surface 61, which extends to arcuate portion 57.

In FIGURE 3 it can be seen that by rotating the cutters, the upper extremity of the cutting edge of each cutter passes adjacent edge 62 and surface 59 of the other cutter. These edges 62 and surfaces 59 are almost in sliding contact. This causes a shearing action across the strip 5 as successive edge portions 62 of each cutter with the adjacent helical surfaces 59 continue to pass each other in shearing engagement, the shear line starting at the top of strip 5 (as shown in FIGURE 3) and progressing to the bottom of the strip to complete a severing action. This overlapping of the cutting edges is shown in FIGURE 4. It will be appreciated that as the cutters continue to rotate, the initial or upper portions of surface 59 which were adjacent one another begin to separate, and this is accompanied by bringing into shearing engagement the lower portions of helical surfaces 59 until a complete shearing action is achieved.

FIGURE 6 shows an elevation view of cutters 6 and 7 during the mid-portion of a cutting operation. It can be seen that at this point the lower portions of the cutting edges 62 are providing the shearing action on the strip 5. It will also be noted that the distance L between the axes 70 and 71 of the cutters 6 and 7 is less than twice the distance l from the rotor axis 70 to the cutting edge 62.

In the operation of the present invention, a helically wound strip is either directly wound on arbor 3 or may be manually placed on the shaft with the end of the strip passed between cutters 6 and 7. Drive 2 is started, and the rotation of arbor 3 passes a suitable length of strip between cutters 6 and 7. When the desired length of material has passed between the cutters, counting device 23 senses this condition and actuates relay 28 which permits current to pass to clutch 18 for a predetermined time, thereby creating a driving connection from drive 2, through shaft 13, through sprockets 14 and 16 by means of the belt 15 to rotate shaft 17 and shaft 19, driving gears 12 and 10, ultimately causing a single rotation of each of the cutters 6 and 7. Initially, cutters 6 and 7 have their uppermost portions, as shown in FIGURE 3, pass adjacent one another. As the cutting edges 62 pass one another, the surface 59 of one cutter overlaps that of the other and shears the strip located therebetween.

It will be appreciated that it is desired to perform this operation in such a manner that the arbor 3 is rotating continuously and the movement of the material being cut is not interrupted. To achieve this, the cutting edges perform their shearing action not only in a direction transverse to the strip, but at the point of shear the cutting edge, because of its helical shape, is such that it moves in substantially the same direction as the direction of movement of the strip. This is achieved by use of a direct drive connection between the arbor and the actuating means 9, shown in FIGURE 1, so that a predetermined relationship exists between the speed of rotation of the cutters 6 and 7, the slopes of the cutting edges 62, and the speed of the arbor so that the linear speed of the strip is substantially the same as the speed of shearing edge in the direction of strip movement as it performs its cutting operation on the strip. The angle of the cut through the strip may also be varied in accordance with the requirements of the end product. This may be achieved by suitably varying the helix angle of the cutting edge and adjusting the speed of the cutters and the arbor recognizing that the point of shear must have a speed component in the direction of the strip at substantially the same speed as the strip.

While there has been described a preferred embodiment of the present invention, it will be appreciated that the invention is not limited thereto, but that various modifications may be made without departing from the scope of the appended claims.

What I claim as new and desire to secure by Letters Patent of the United States is:

1. In an apparatus for severing a moving strip of material having spaced apart helical turns, the combination of means for rotating the helically wound strip turns about a first axis, cutting means including a first member having a first cutting edge of general helical configuration rotatable about a second axis disposed generally normal with respect to the first axis and a second member for cooperation with said first cutting edge to produce a cutting action, and means for advancing the cutting edge across the path of a single turn of the rotating strip in substantially the same direction and at substantially the same linear speed as the strip while the cutting edge severs the single strip turn in relation with said second member.

2. The apparatus according to claim 1 in which the first member of the cutting means comprises a first rotor member having a general cylindrical shape with a substantially helical surface extending therefrom, the edge of the helical surface defining the first cutting edge, rotation of the rotor member causing successive portions of the cutting edge to pass across the path of a single turn of the rotating helically wound strip thereby severing the strip in cooperation with the second member.

3. The apparatus according to claim 2 in which the second cooperating member of the cutting means comprises a second rotor having a general cylindrical shape with a helical surface the edge of which defines a second cutting edge, the first and second cutting edges having substantially equal but opposite slope angles.

4. The apparatus according to claim 3 further comprising means for rotating the rotors at substantially the same speed but in different directions whereby portions of the cutting edges and the helical surfaces of each rotor pass adjacent each other progressively to shear a strip turn of material passing between the rotor members.

5. The apparatus according to claim 4 further comprising means for rotating the rotor members at a speed such that the cutting edges while shearing the strip turn move substantially at the same speed as the strip turn.

6. The apparatus according to claim 5 further comprising means for actuating the means for cutting the strip upon the passage of a predetermined amount of strip material past the rotor members.

7. In a method for severing a moving helically wound strip having generally separated turns the steps which comprise: rotating the individual turns of the helically wound strip between two cutting edges, bringing the cutting edges together after a predetermined amount of strip material has passed between the two cutting edges from non-operated stationary positions to progressively cut from one edge of the strip to the other edge while simultaneously moving the cutting edges substantially at the same speed with the rotating helical wound strip and returning the cutting edge to said nonoperated stationary position after the strip turn has been severed while continuing the rotation of individual turns of the helical wound strip between the two cutting edges.

8. In an apparatus for severing a moving strip of material having loosely separated helical turns, means for severing the strip of material including at least one rotatable cutting edge having a general helical shape and a member arranged to cooperate with said cutting edge to sever the strip means for rotating the strip turns individually between said cutting edge and the cooperating member, with the side surface of the strip turns being arranged approximately parallel to the axis of rotation of the rotatable cutting edge means for periodically initiating rotation of the cutting edge into severing relation with said cooperating member upon a predetermined amount of strip material passing adjacent said edge to sever the strip and for discontinuing rotation of said edge after the strip has been severed without interrupting the advancement of the strip of material between the cutting edge and the cooperating member, the portion of the cutting edge severing the strip moving in the same direction and at substantially the same speed as the strip.

9. In an apparatus for severing a rotating strip of helical wound material having separated turns, means carrying the strip and driving it around a first axis with the sides of the turns being arranged generally perpendicular to said first axis, cutting means including at least one rotor member rotatable about a second axis approximately parallel to the turn sides and a cooperating member, means for driving the strip turns individually between said rotor and cooperating member, said rotor member having a generally cylindrical periphery with a substantially helical surface projecting radially beyond the periphery to define an arcuate cutting edge, said edge arranged to provide a cutting engagement with said cooperating member for an arcuate length of less than 360°, and means for moving said edge into and out of cutting engagement with the cooperating member to sever an individual strip turn, with the lineal distance between the adjacent peripheries of said members when out of cutting engagement being dimensionally greater than the thickness of the strip driven angularly therebetween.

10. In an apparatus for severing a continuously rotating strip of helical wound material having generally separated turns, an arbor carrying the strip and rotating it about a first axis with the sides of the strip turns being arranged to be driven approximately perpendicular with said first axis, cutting means including a rotary member rotatable about a second axis generally parallel with the sides of the strip turns and a cooperating member, means for driving the strip turns individually between said rotary and cooperating members said rotary member having a generally cylindrical periphery with a substantially helical surface projecting radially beyond the periphery to define a cutting edge circumscribing an arc of less than 360° of said periphery, means for periodically actuating and turning the cutting edge of the helical surface between operative cutting and stationary disengaged positions relative to said cooperating member at predetermined intervals to sever periodically the strip turns as they are individually driven between said rotary and cooperating members, the smallest lineal distance between said members when out of cutting engagement being dimensionally greater than the thickness of the strip to permit free angular movement of the strip between said members during such intervals of disengagement.

11. In a method for severing a helically wound strip having a plurality of generally separated turns rotatable abount a first axis, driving the turns individually between two cutting edges at least one of which includes a rotary member rotatable about a second axis in generally perpendicular relation with respect to the first axis, moving at least one of the edges from a nonoperated position into cutting engagement with the other edge to sever the strip transversely across its width while concurrently moving at least one of the cutting edges substantially at the same speed as that of the continuously moving strip, and returning the cutting edges to the nonoperated position in which the edges are spaced apart a sufficient lineal distance to permit continuous and unimpeded passage of the strip therebetween.

12. In a method for severing a helically wound strip having a plurality of turns rotatable about a first axis, driving the turns individually between two cutting edges at least one of which includes a rotary member rotatable about a second axis substantially perpendicular to the first axis, moving the edges from nonoperated positions into cutting engagement to sever the strip transversely across its width while concurrently moving said cutting edges substantially at the same speed as that of the continuously moving strip, and returning each of the cutting edges to the nonoperated position in which the edges are spaced apart a sufficient lineal distance to permit continuous and unimpeded passage of the strip therebetween.

References Cited in the file of this patent
UNITED STATES PATENTS

| | | |
|---|---|---|
| 724,798 | Bruckmann | Apr. 7, 1903 |
| 1,159,017 | Goss | Nov. 2, 1915 |
| 2,026,533 | Haupt | Jan. 7, 1936 |
| 2,160,497 | Garrett | May 30, 1939 |
| 2,172,359 | Campbell | Sept. 12, 1939 |
| 2,404,424 | Balla | July 23, 1946 |
| 2,515,296 | Egan | July 18, 1950 |

FOREIGN PATENTS

| | | |
|---|---|---|
| 470,543 | France | June 18, 1914 |